United States Patent
Manor et al.

(10) Patent No.: US 7,540,925 B2
(45) Date of Patent: Jun. 2, 2009

(54) METHOD OF CLEANING GREENHOUSE ROOFS

(75) Inventors: Gedalyahu Manor, 15 Adam Hacohen Street, Haifa 32714 (IL); David Jacobs, Haifa (IL); Yossi David, Yogneam Elite (IL)

(73) Assignee: Gedalyahu Manor, Haifa (IL)

( * ) Notice: Subject to any disclaimer, the term of this patent is extended or adjusted under 35 U.S.C. 154(b) by 361 days.

(21) Appl. No.: 11/337,313

(22) Filed: Jan. 23, 2006

(65) Prior Publication Data

US 2006/0118136 A1 Jun. 8, 2006

Related U.S. Application Data

(63) Continuation of application No. PCT/US2004/023323, filed on Jul. 19, 2004.

(60) Provisional application No. 60/490,196, filed on Jul. 24, 2003.

(51) Int. Cl.
*B08B 7/04* (2006.01)
*B60S 1/06* (2006.01)

(52) U.S. Cl. .............................. 134/6; 15/49.1; 15/50.2; 15/52.2; 15/250.202

(58) Field of Classification Search ................. 15/49.1, 15/50.1, 50.3, 52.1, 88.4, 246, 250.202; 134/172, 134/174, 184, 6

See application file for complete search history.

(56) References Cited

U.S. PATENT DOCUMENTS

| | | | |
|---|---|---|---|
| 2,226,633 A | 12/1940 | Namet | |
| 2,408,555 A | 10/1946 | Hart | |
| 4,392,270 A | 7/1983 | Magee | |
| 5,323,508 A * | 6/1994 | Sheldrake | ................ 15/250.22 |
| 6,709,529 B1 | 3/2004 | Mekwinski | |

* cited by examiner

*Primary Examiner*—Michael Barr
*Assistant Examiner*—Saeed T Chaudhry
(74) *Attorney, Agent, or Firm*—Frishauf, Holtz, Goodman & Chick, P.C.

(57) ABSTRACT

The invention provides a method of cleaning greenhouse roofs mechanically to remove the accumulation of dust and grit. The method comprises at least one dust cleaning device moving over a soft roof The cleaning device is controlled to follow the irregular surface of the soft roof with limited pressure to avoid damage. The invention also provides a dust-cleaning system to remove dust and grit from the soft roof.

21 Claims, 10 Drawing Sheets

METHOD OF CLEANING GREENHOUSE ROOFS

This application is a continuation application of International Application PCT/US2004/023323 filed Jul. 19, 2004, which is hereby incorporated by reference which claims the priority of Provisional Application Ser. No. 60/490,196 filed Jul. 24, 2003.

BACKGROUND OF THE INVENTION

The invention relates to a method and equipment for cleaning greenhouse roofs made of plastic sheets. For the growing of greenhouse crops the most important factor for their development is the amount of sunlight radiated upon them. That is why low light transparency of the covering material is of paramount Importance. The most important factor is the selection of the type of material covering the greenhouse roof. In the market there are different kinds of covering materials of various types which are divided in to two groups: the first one is rigid, for example, Glass and plastic plates like polycarbonate. The second group is flexible (soft) covering materials of plastic sheets such as PVC and polyethylene.

The most popular and most extensively used covering in Israel is the soft plastic sheeting. The roofs accumulate large quantities of dust, which prevent the transfer of light into the greenhouse and retard the development rates of the produce and delay the ripening process. Reduction of light transfer has a negative effect on the size of the fruit, plants produce est. With certain types of flowers the time between blooming of the flowers found to be longer.

Many researches investigated the effect of light transfer in greenhouses on plant development. It was found that after regular cleaning of the greenhouse's roof during the growth of the produce, the result was 30% increase of produce, increase of fruit size and quality and flowers with longer stems. It also shortens the time between each blooming and in general a greater number of stems and branches was found per plant. This data has a great economic influence on agriculture. Where by the use of a given area and amount of water, there is an increase in quantity and quality of the produce by a factor up to 30%. This is a major achievement. At present, some farmers in Israel confront these problems by manual and expensive washing, which is time consuming and made when the workers are free from other work in the greenhouse. For this reason greenhouse roofs are rarely cleaned, just once or twice per growth season, which is definitely not enough. There is a great advantage to be gained by the regular and periodic cleaning of the greenhouse roof. The preferred solution is to clean it by mechanical and automation means.

On the market there is a wide range of greenhouses of different dimensions: width, height, length est. some are characterized by different roof cross section e.g. symmetrical or asymmetrical. At the present moment there do not exist roof cleaning devices that answer to these conditions, although VIKA company produce a cleaning machine for glass greenhouses with one uniform shape.

It is an object of the invention to provide a method and apparatus for cleaning soft plastic sheeting roofs automatically.

SUMMARY OF THE INVENTION

The invention provides a method for cleaning plastic covered greenhouse roofs automatically including several rows of the roofs continuously. The cleaning method can be made by various means such as: rotary brushes, moving sponges, strips of cloth or materials of varying textures, which provide soft touch to the plastic cover material. The method provides automatic pressure control between the cleaning device and the plastic roof while adjusting the height of each of the device to the irregular surface. The pressure control is needed to prevent damage to the sensitive plastic cover. Scratches on the plastic sheeting reduce light transfer and accumulate more dust than before.

The pressure control can be of several types: pneumatic system with pistons, Hydraulic system with pistons, springs systems or electric systems, and connected to an over running bridge.

The mechanical method for removing dust and grit from the plastic sheet can be combined with air suctioning system or with water washing system. The dust separators of the air suctioning system can be of the following types: Gravitational and Inertial Collectors, ESP's, Sacks or Filters.

The over running bridge is moving along the greenhouse roof by a controlled motor which drives the wheels running along the gutters at each side of the roof. At the end of the roof the bridge is collected by a moving base, which moves it to the second roof and let it start moving along it and clean it.

The cleaning device is mounted to the bridge via a moving platform, which can move along the bridge. In a preferred embodiment the platform moves along the bridge, while the cleaning device cleans a path of its own width perpendicular to the length of the greenhouse. At the end of the bridge the cleaning device stops and is lifted from the roof. The bridge moves to its next stop along the gutters and the cleaning device cleans another path. The stops along the gutters are defined by a sensing system.

In another preferred embodiment at least one platform with at least one cleaning device moves with the bridge along the gutters of the roof and cleans a lengthwise path. At the end of the roof the bridge stops and the cleaning device is lifted from the roof. The platform with the cleaning device moves along the bridge to its next position, and the cleaning device is lowered to the roof. Sensors define the positions of the platform with the cleaning device on the bridge. The bridge moves to the other direction along the gutters and cleans another lengthwise path. After reaching the other end the platform with the cleaning device moves along the bridge to its new position, and the cleaning device is lowered to the roof to clean another path and so on, until the whole roof is clean. At the end of the roof the bridge moves to the second roof and starts moving along its gutters and cleans it.

In a preferred embodiment a moving base at the end of the roof collects the bridge. The moving base with the bridge moves to the next arch of the roof and the bridge starts to clean it. In a preferred embodiment the moving base moves on rails on the wall of the greenhouse. In another preferred embodiment the rails are on the ground near the wall of the greenhouse. In another preferred embodiment the rails are on a structure near the wall of the greenhouse. In another preferred embodiment the base with the bridge on it is being taken by any kind of lift vehicle to another greenhouse to clean its roof.

DETAILED DESCRIPTION

Figure 1:
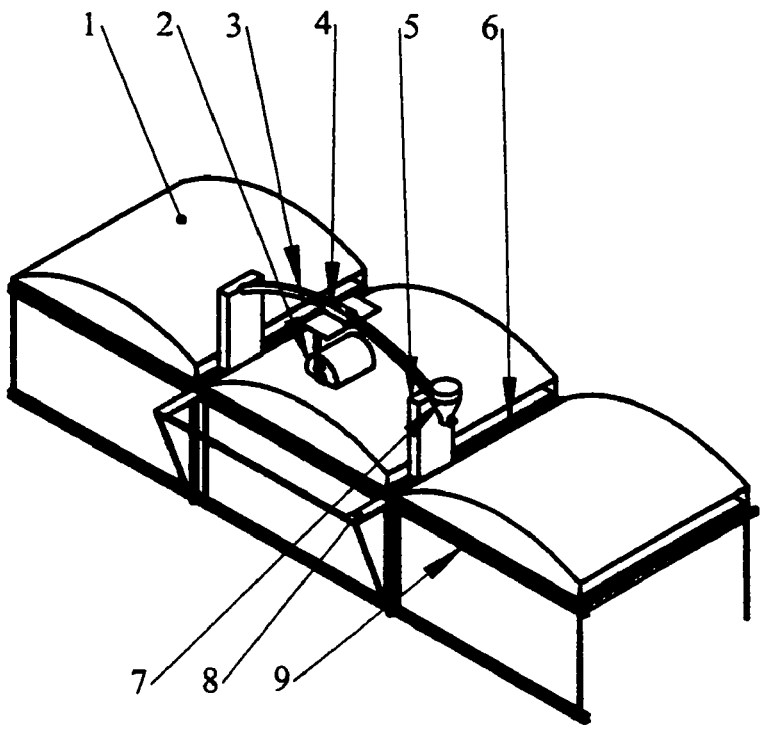
FIG. 1 is a perspective view of a symmetrical greenhouse covered with three sections' roof (symmetrical arches) with the cleaning device running along the bridge.

FIG. 1 is a perspective view of a symmetrical greenhouse covered with three sections' roof 1 (symmetrical arches) with the cleaning device 2 running along the bridge 3. The platform 4 is running along the stationary bridge 3 with the cleaning device 2 connected to it. The bridge 3 is supported and moved by the running system 5 on its two sides. The running systems 5 are supported and directed by the gutters 6. The running systems 5 stop the bridge at predetermined stops to cover the whole length of the roof. The dust separator 7 is part of the air suction system (not shown here). The end vehicle 8 is collecting the bridge 3 at the end of the gutters 6 and moves it to the next arch 1 while running along the rails 9 on the wall.

Figure 2:
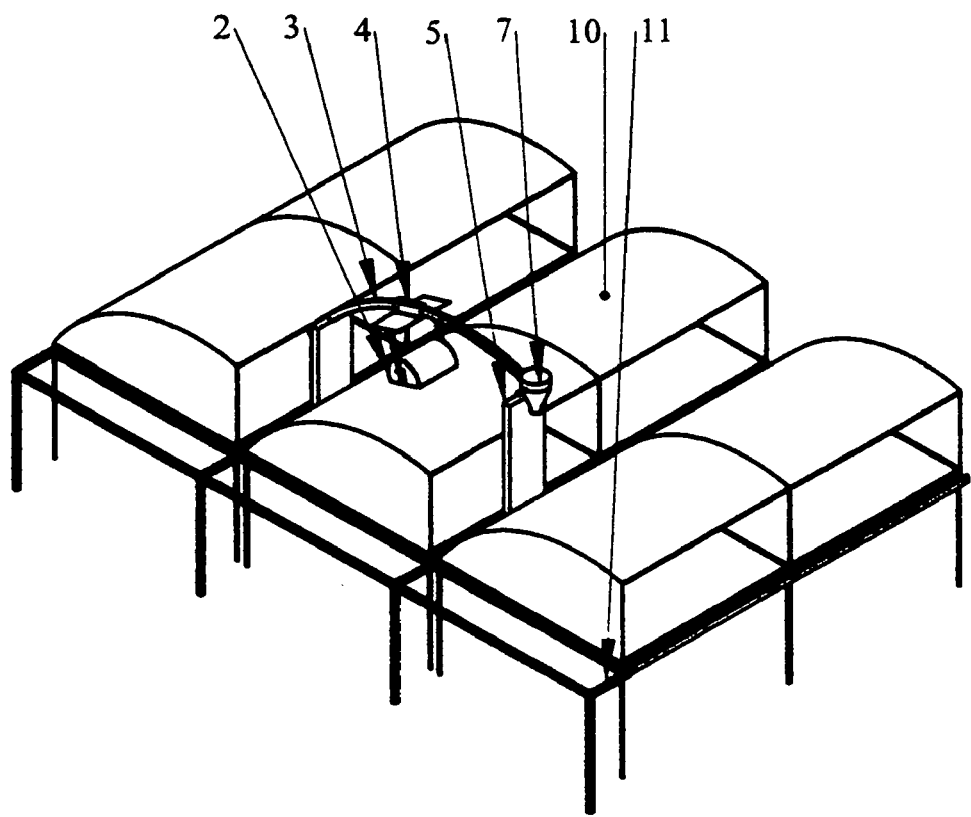
FIG. 2 is a perspective view of an asymmetrical greenhouse covered with three sections' roof (asymmetrical arches) with the cleaning device running along the bridge.

FIG. 2 is a perspective view of an asymmetrical greenhouse covered with three sections' roof 10 (asymmetrical arches) with the cleaning device 2, mounted to the platform 4, running along the stationary bridge 3. The height of the running systems 5 is adjusted to the shape of the asymmetrical arch 10. The dust separator 7 is part of the air suction system (not shown here). The rails 11 at the end of the gutters 6 are to support the bridge 3 while moving from one arch 10 to the next one. A section of the rails 11 can be moved with the bridge 3 by any kind of lift vehicle to another greenhouse to clean it.

Figure 3:
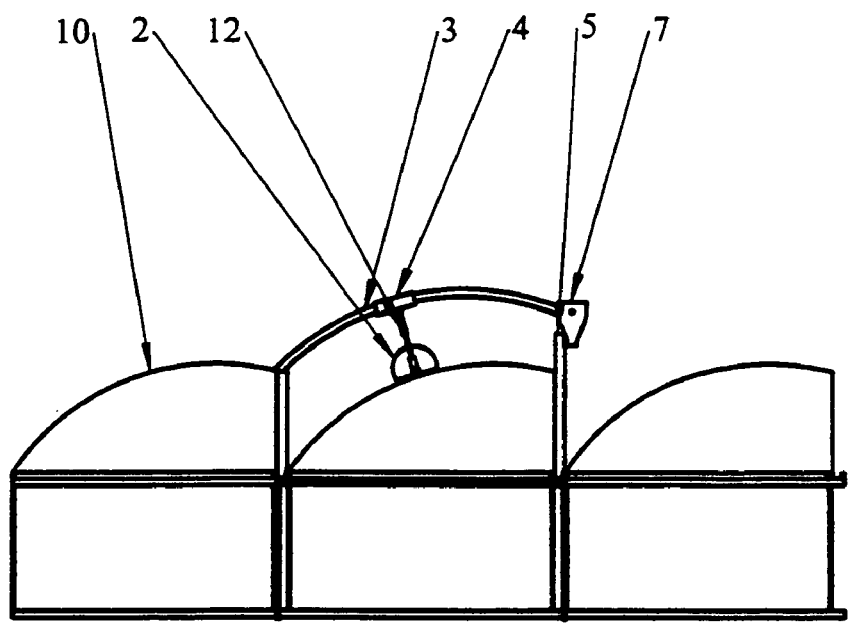
FIG. 3 is schematic cross section of roofs of an asymmetrical nature, with the cleaning device running along the bridge.

FIG. 3 is a schematic cross section of roofs 10 of an asymmetrical nature, with the cleaning device 2, mounted to the platform 4 via pressure controlled devices 12. The cleaning direction is along the bridge 3.

Figure 4:
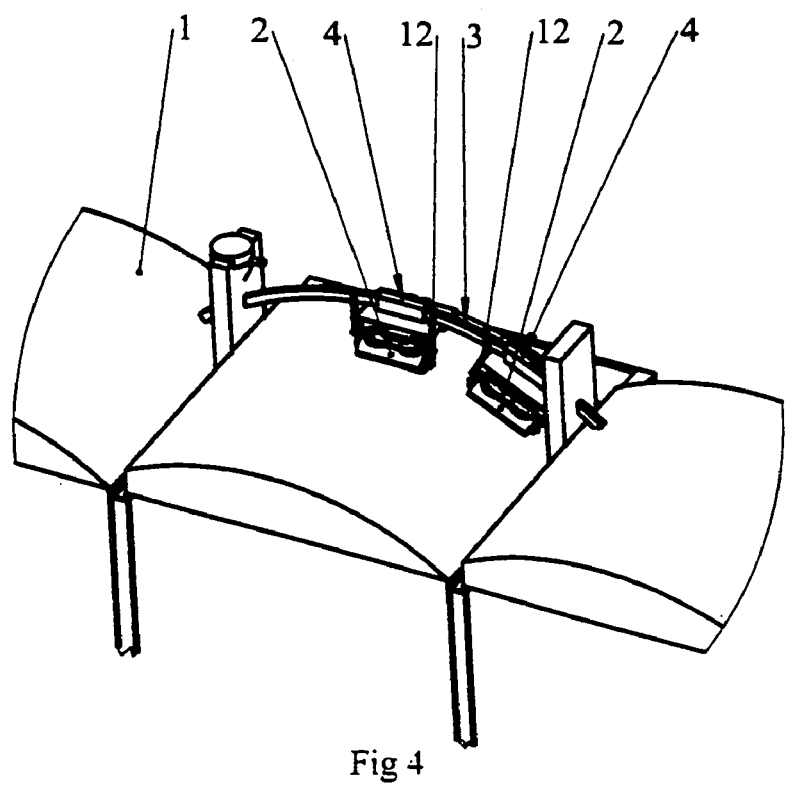
FIG. 4 is a perspective view of a symmetrical greenhouse covered with three sections' roof (symmetrical arches) with the two cleaning devices stationed along the bridge in order to clean two paths along the roof.

FIG. 4 is a perspective view of a symmetrical greenhouse covered with three sections' roof 1 (symmetrical arches) with the two cleaning devices 3, mounted to the platforms 4 via pressure controlled devices 12. The cleaning direction is along the roof 1 and the cleaning devices 2 are stationed along the bridge 3 in order to clean two paths along the roof 1. At the end of the roof 1, the cleaning devices 2 move to new positions on the bridge 3 to clean two other paths in parallel to the first ones. The two cleaning devices 2 move again to new position at the other end until the entire arch of the roof 1 is clean. At the end of the arch 1 the bridge 3 moves to the next arch.

Figure 5:
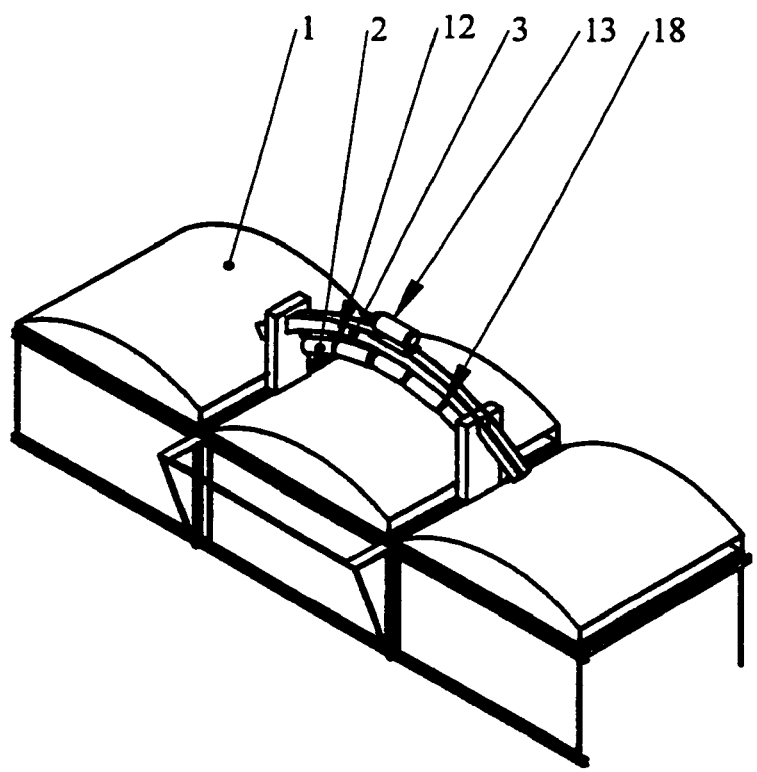
FIG. 5 is a perspective view of a symmetrical greenhouse covered with three sections' roof (symmetrical arches) with several cleaning devices stationed along the bridge in order to clean the whole width while the bridge runs along the roof.

FIG. 5 is a perspective view of a symmetrical greenhouse covered with three sections' roof 1 (symmetrical arches) with several cleaning devices 2 stationed along the bridge 3 in order to clean the entire width of the arch 1 while the bridge 3 runs continuously along the roof. One or more motors 13 power the cleaning devices 2. The motors 13 can be electric, pneumatic, or hydraulic ones. The cleaning devices 2 are supported to the bridge via pressure controlled devices 12 in order to adjust their height to the irregular surface of the roof 1. The cleaning devices 2 are connected to each other by flexible couplings 18 to rotate them while moving up and down, and changing angles along the irregular surface of the roof 1.

Figure 6:
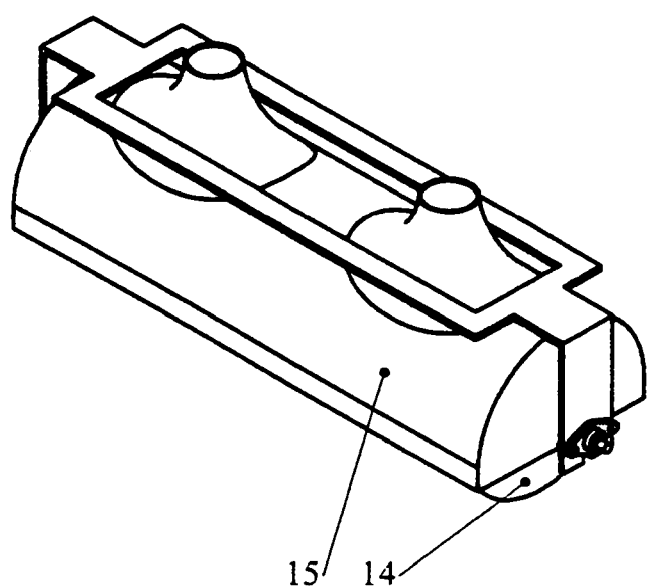
FIG. 6 is a perspective view of a cleaning device with a rotating brush.

FIG. 6 is a perspective view of a cleaning device 2 using a rotating brush 14 covered with a hood 15.

Figure 7:
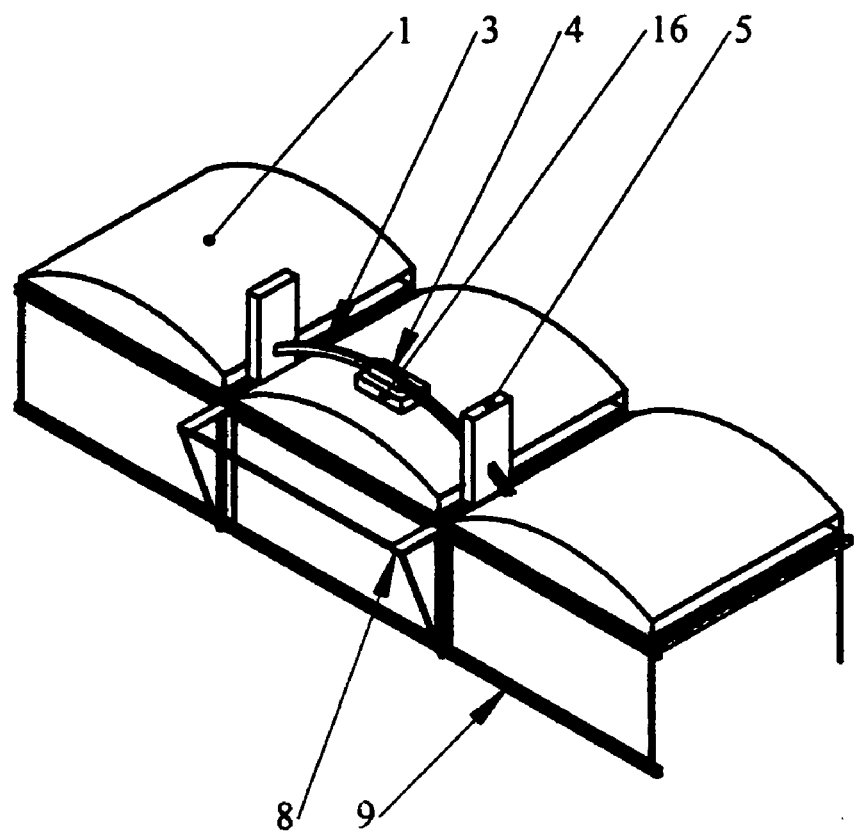
FIG. 7 is a perspective view of a cleaning device with a stationary sponge running on the roof.

FIG. 7 is a perspective view of a cleaning device 2 with a stationary sponge 16 running on the roof cover 1.

Figure 8:
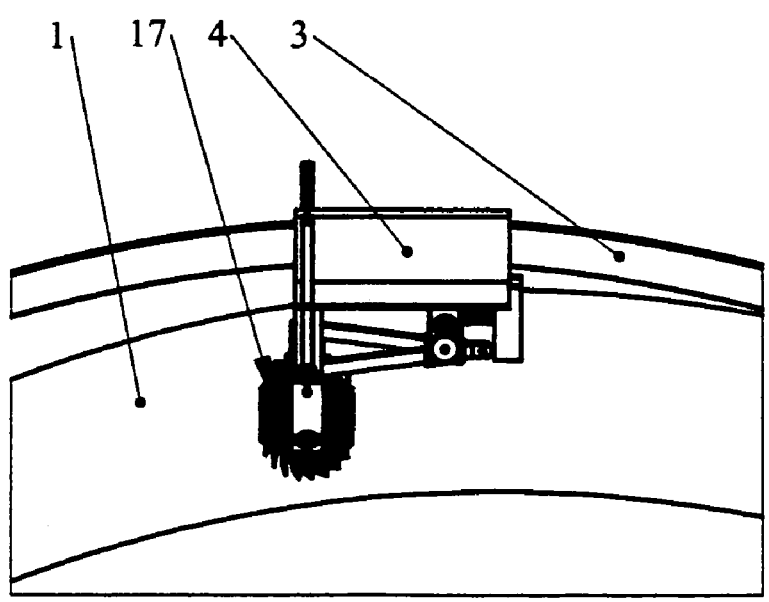
FIG. 8 is a perspective view of a cleaning device with rotating strips of cloth.

FIG. 8 is a perspective view of a cleaning device 2 with rotating strips of cloth 17 running on the roof cover 1.

Figure 9:
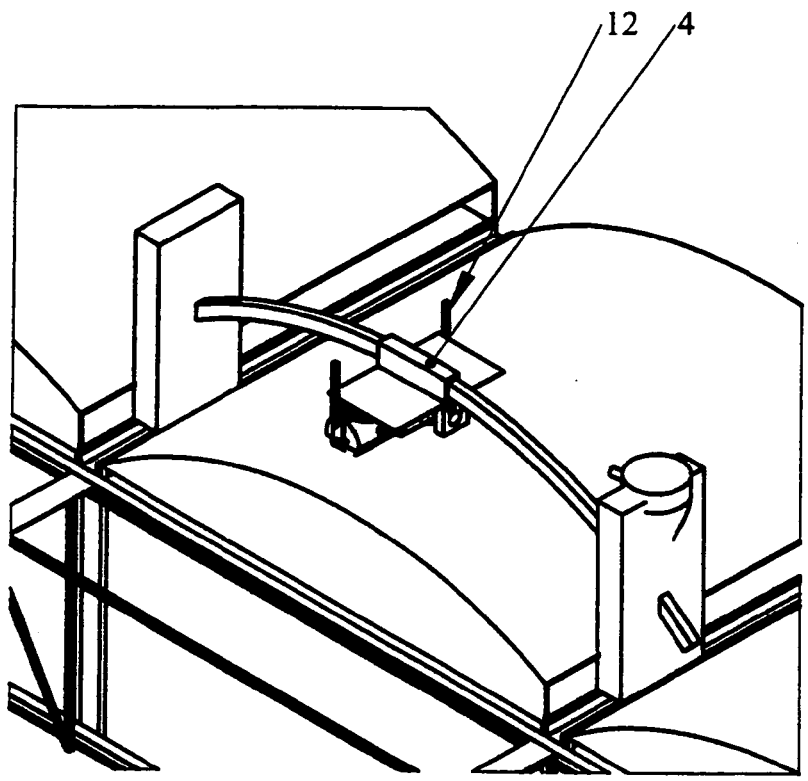
FIG. 9 is a perspective view of a cleaning device mounted to the bridge via a platform with two pressure control devices and a universal joint, for cleaning along the bridge.

FIG. 9 is a perspective view of a cleaning device 2 mounted to the bridge 3 via a platform 4 with two pressure controlled devices 12 and a universal joint 19, for cleaning the roof cover 1 along the bridge 3. The two pressure-controlled devices 12 control the pressure between the cleaning element (14, 16 or 17) of the cleaning device 2 and the roof cover 1 at each side separately. The universal joint 19 is the third mounting point and it enables the cleaning device 2 to move up and down at each side separately, to follow the irregular surface of the roof cover 1.

Figure 10:
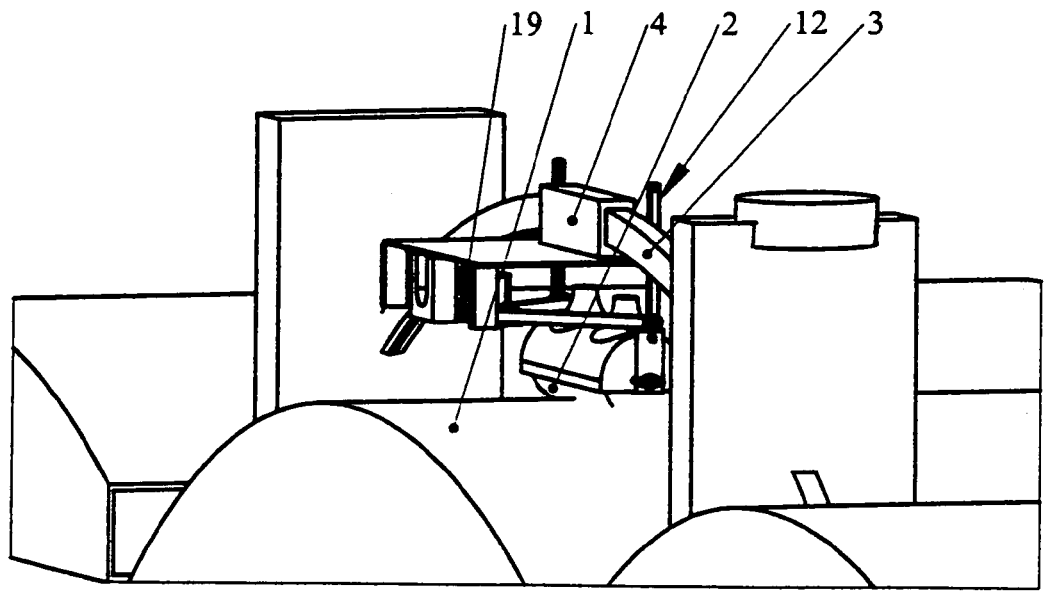
FIG. 10 is a perspective view of a cleaning device mounted to the bridge via a platform with two pressure control devices and a universal joint, for cleaning along the roof.

FIG. 10 is a perspective view of a cleaning device 2 mounted to the bridge 3 via a platform 4 with two pressure controlled devices 12 and a universal joint 19, for cleaning along the roof cover 1 while following its irregularity.

Figure 11:
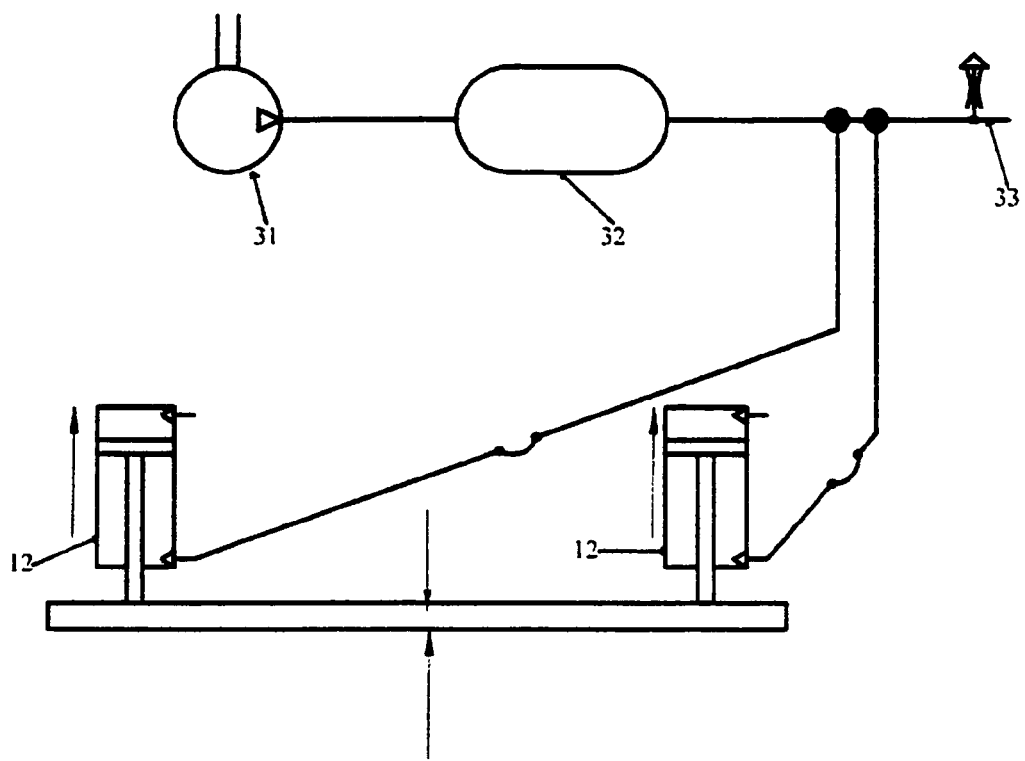
FIG. 11 is a schematic diagram of a pneumatic pressure control system.

FIG. 11 is a schematic diagram of a pneumatic pressure control system. The pressure between the cleaning element (14, 16 or 17) of the cleaning device 2 and the roof cover 1 at each side separately is controlled by the two pneumatic cylinders (pistons) 12, which are connected to the pressure controlled air tank 32. When the pressure between the cleaning element (14, 16 or 17) of the cleaning device 2 and the roof cover 1 at either side is above the adjusted one, the valve 33 release air to maintain the required pressure. When the pressure between the cleaning element (14, 16 or 17) of the cleaning device 2 and the roof cover 1 at either side is below the adjusted one, the compressor 31 starts to press air until the pressure in the tank 32 reaches the required one.

Figure 12:
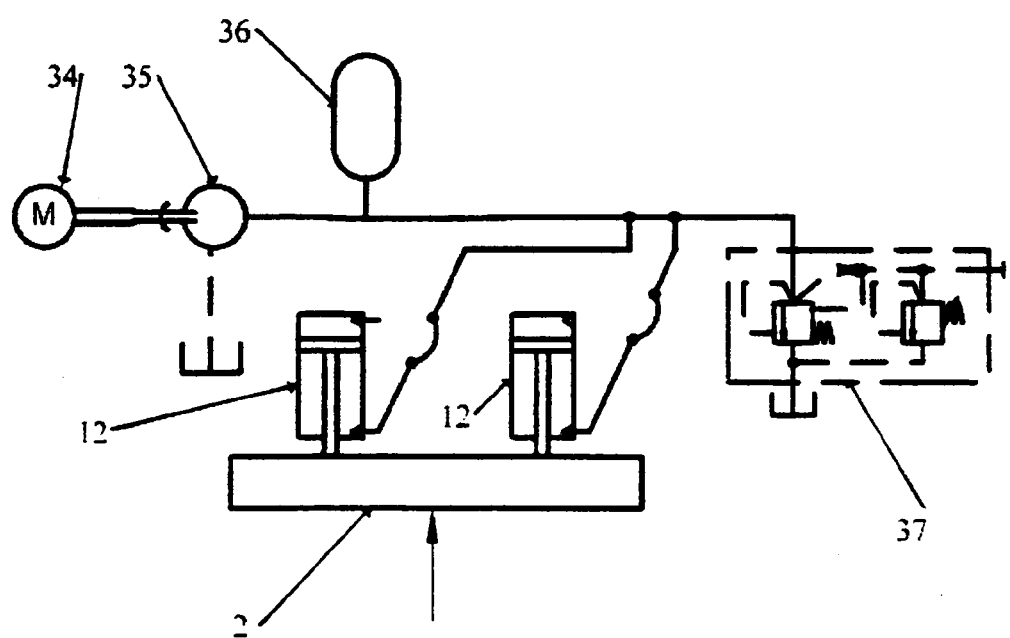
FIG. 12 is a schematic diagram of a hydraulic pressure control system.

FIG. 12 is a schematic diagram of a hydraulic pressure control system. The pressure between the cleaning element (14, 16 or 17) of the cleaning device 2 and the roof cover 1 at each side separately is controlled by the two hydraulic cylinders (pistons) 12, which are connected to the pressure controlled accumulator 36. When the pressure between the cleaning element (14, 16 or 17) of the cleaning device 2 and the roof cover 1 at either side is above the adjusted one, the valve 37 release oil to the sump to maintain the required pressure. When the pressure between the cleaning element (14, 16 or 17) of the cleaning device 2 and the roof cover 1 at either side is below the adjusted one, the valve 37 starts to press oil from the pump 35, powered by the motor 34, until the pressure in the accumulator 36 reaches the required one.

Figure 13:
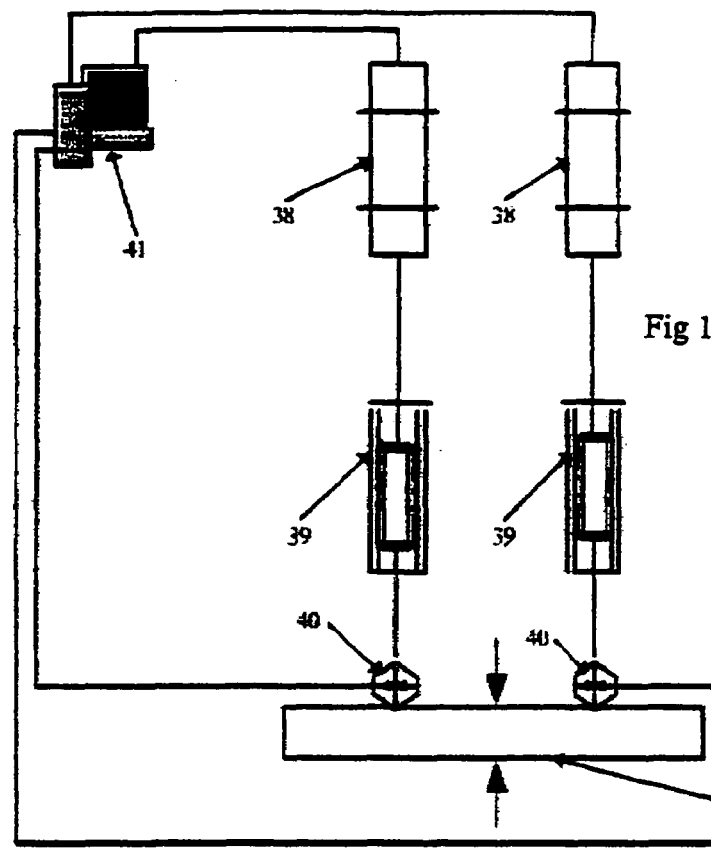
FIG. 13 is a schematic diagram of an electric powered pressure control system.

FIG. 13 is a schematic diagram of an electric powered pressure control system. The pressure between the cleaning element (14, 16 or 17) of the cleaning device 2 and the roof cover 1 at each side separately is controlled by the two electric actuators 38, load sensors 40 and two springs 39. The two electric actuators 38 are connected to the computerized controller 41, which is measuring the pressure between the cleaning element (14, 16 or 17) of the cleaning device 2 and the roof cover 1 at either side by the load sensors 40. When the pressure between the cleaning element (14, 16 or 17) of the cleaning device 2 and the roof cover 1 at either side is above or below the adjusted one, the sensors measure it and send the information to the computerized controller 41, which sends the right order to the electric actuators 38, to maintain the required pressure.

Figure 14:
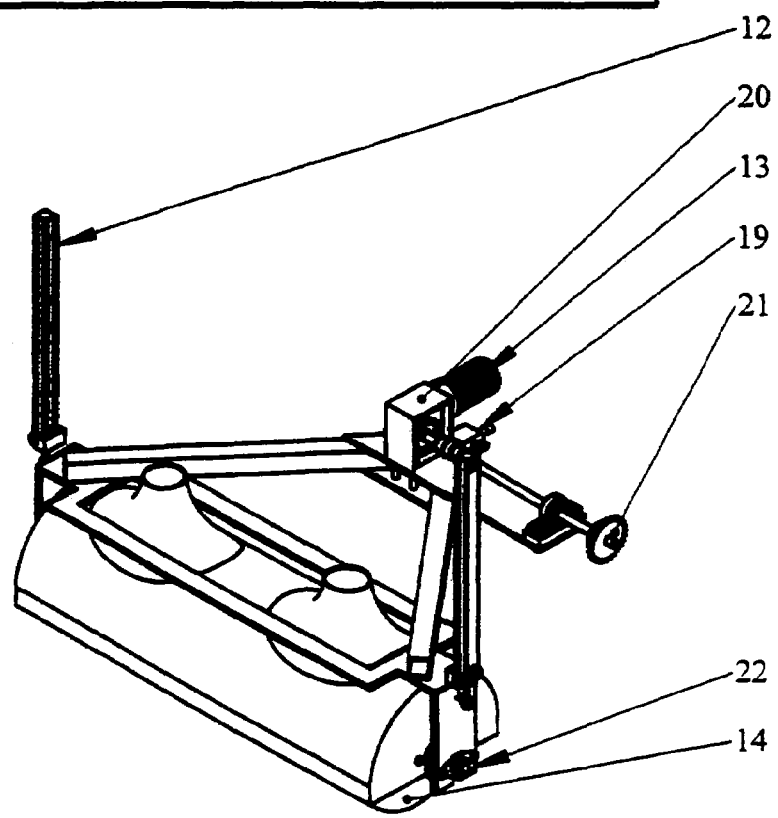
FIG. 14 is a perspective view of a cleaning device with the driving motor near the universal joint.

FIG. 14 is a perspective view of a cleaning device 2 with the driving motor 13 near the universal joint 19 to lower the weight on the pressure controlled devices 12. The transmission 20 changes the number of revolutions to be adequate to the revolutions of the cleaning element (14 or 17) of the cleaning device 2. The chain transmission 21 connects the transmission 20 to the shaft 22 of the cleaning element (14 or 17) of the cleaning device 2.

Figure 15:
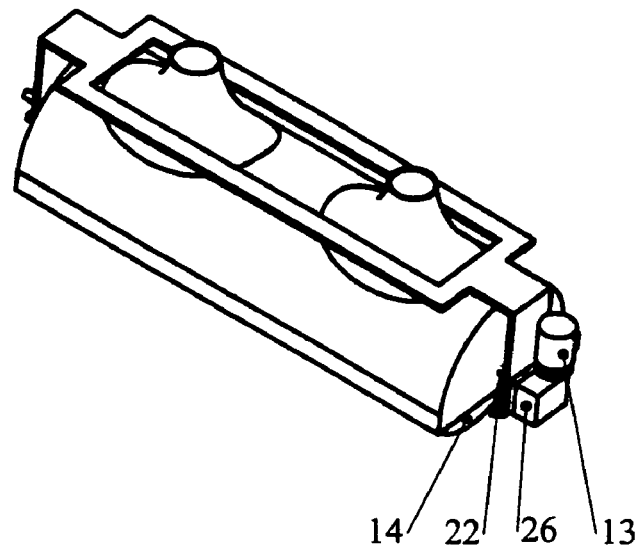
FIG. 15 is a perspective view of a cleaning device with the driving motor connected directly to the rotating shaft of the cleaning element of the cleaning device.

FIG. 15 is a perspective view of a cleaning device 2 with the driving motor 13 connected directly to the rotating shaft 22 of the cleaning element (14 or 17) of the cleaning device 2.

Figure 16:
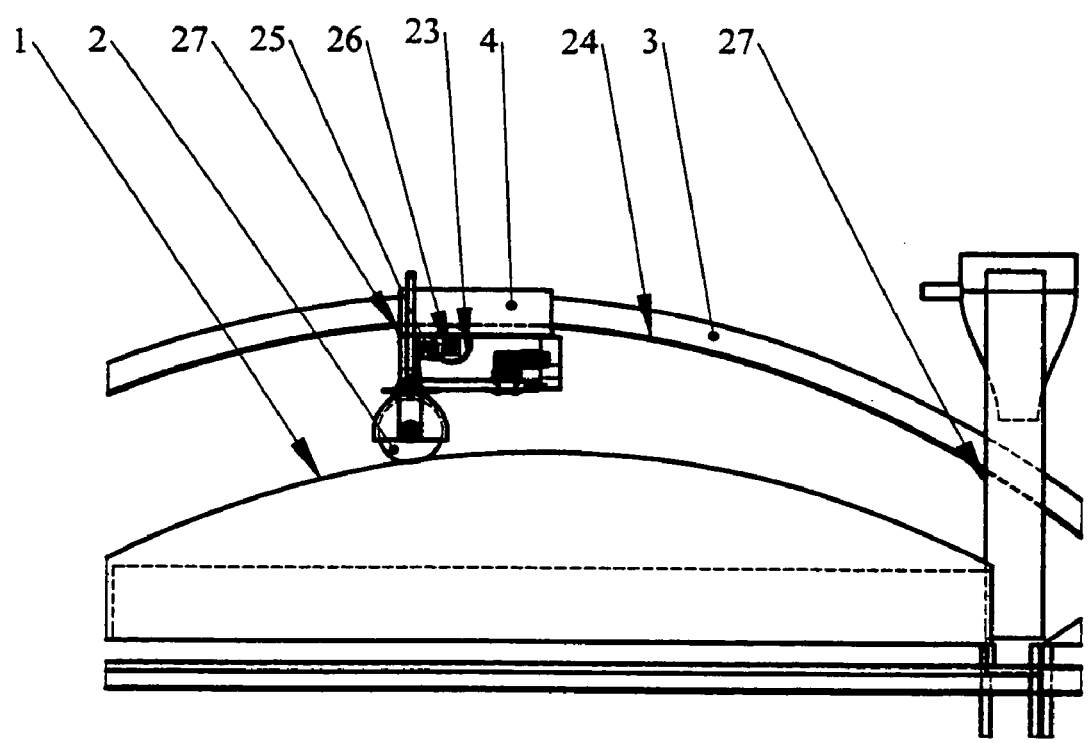
FIG. 16 is a side view of the platform for the cleaning device with the powered pulley running along a welded chain along the bridge.

FIG. 16 is a side view of the platform 4 for the cleaning device 2 with the powered pulley 23 running along a welded chain 24 along the bridge 3. The motor 25 powers the pulley 23 via transmission means 26. The motor 25 can be electric, pneumatic, or hydraulic one. The sensors 27 senses the location of the platform 4 with the cleaning device 2 in order to stop it at the end when running along the bridge 3, or at the right location when running along the roof 1 and changing position for the next run. The sensors 27 can be on the bridge, on the pulley or in the driving system of the motor.

Figure 17:
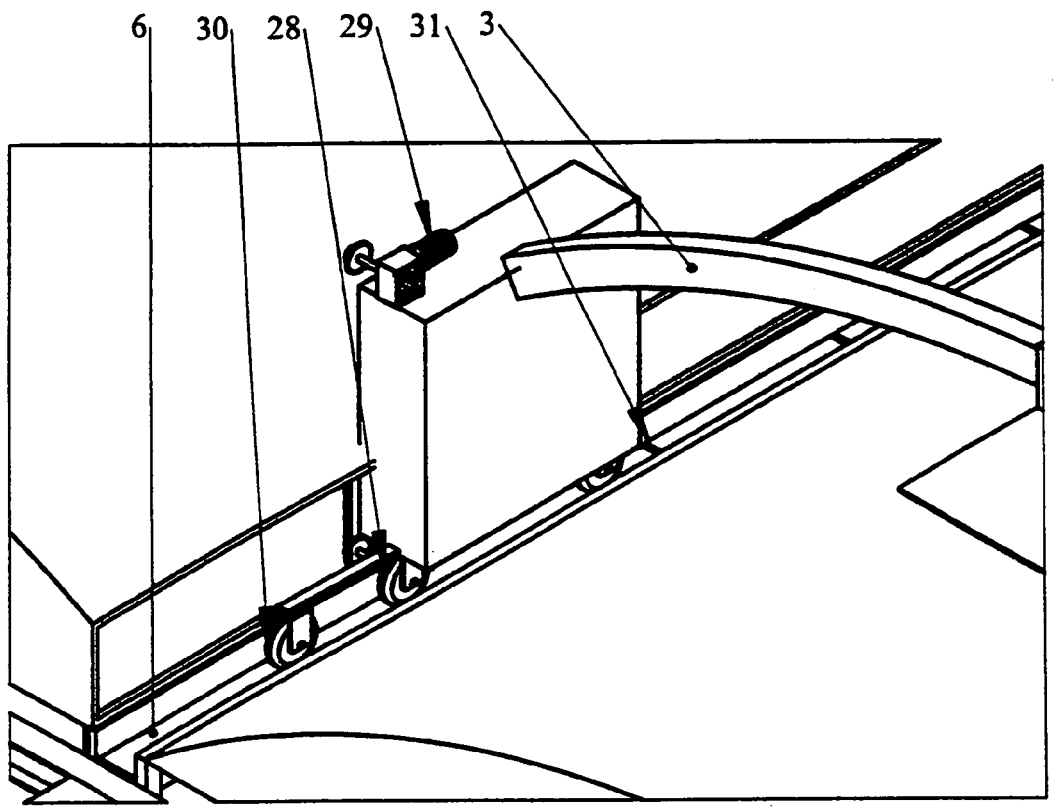
FIG. 17 is a perspective view of a running system of one side of the bridge inside the roof's gutter.

FIG. 17 is a perspective view of a running system 5 of one side of the bridge 3 inside the roofs gutter 6. The wheels 28 run in the gutter 6 and powered by the motor 29. The motor 29 can be electric, pneumatic, or hydraulic one. The guiding wheel 30 controls the angle of the bridge 3 to be perpendicular to the gutter 6. The sensors 31 sense the location of the bridge 3 along the gutter 6 to stop it for each step while cleaning a path perpendicular to the gutter 6, and at the end.

Figure 18:
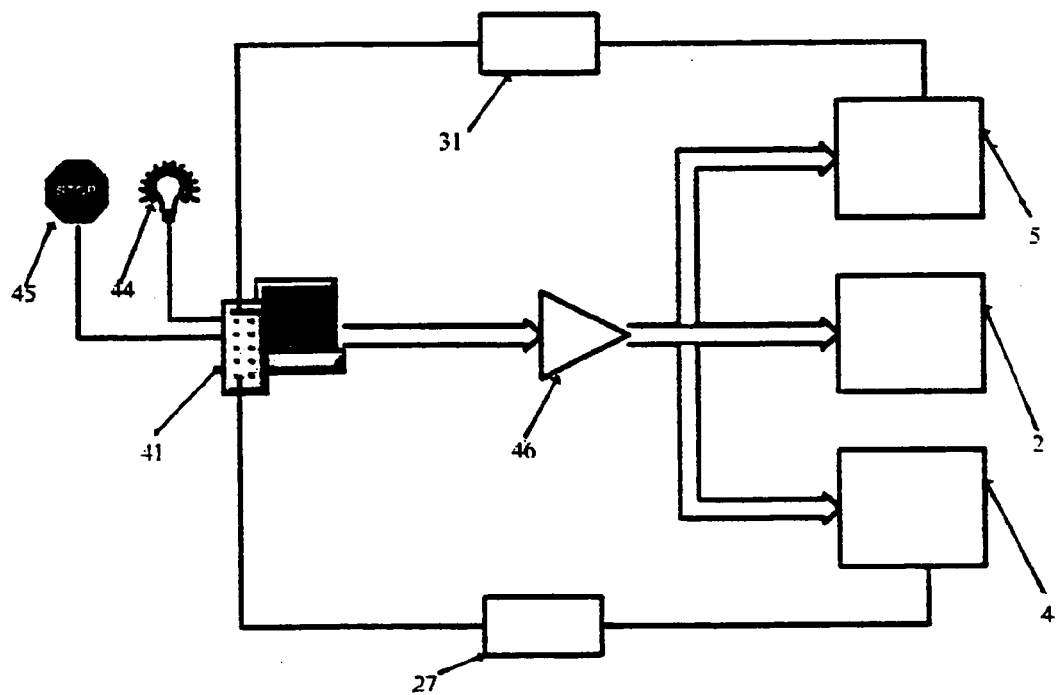
FIG. 18 is a schematic diagram of the moving control system of the platform 4 for the cleaning device 2 along the bridge 3 and the bridge 3 along the roof 1. The lamp 44 is a warning sign for mull functioning and the switch 45 is to stop the system.

FIG. 18 is a schematic diagram of the moving control system of the platform 4 for the cleaning device 2 along the bridge 3 and the bridge 3 along the roof 1. The sensors 27 and 31 sense locations of the platform 4 and the bridge 3 and send the information to the computerized controller 41. The computerized controller 41 uses the algorithms in it to decide the right orders and sends them via the adapter 46 to the cleaning device 2, to the platform 4 or the running systems 5 of the bridge 3.

Figure 19:
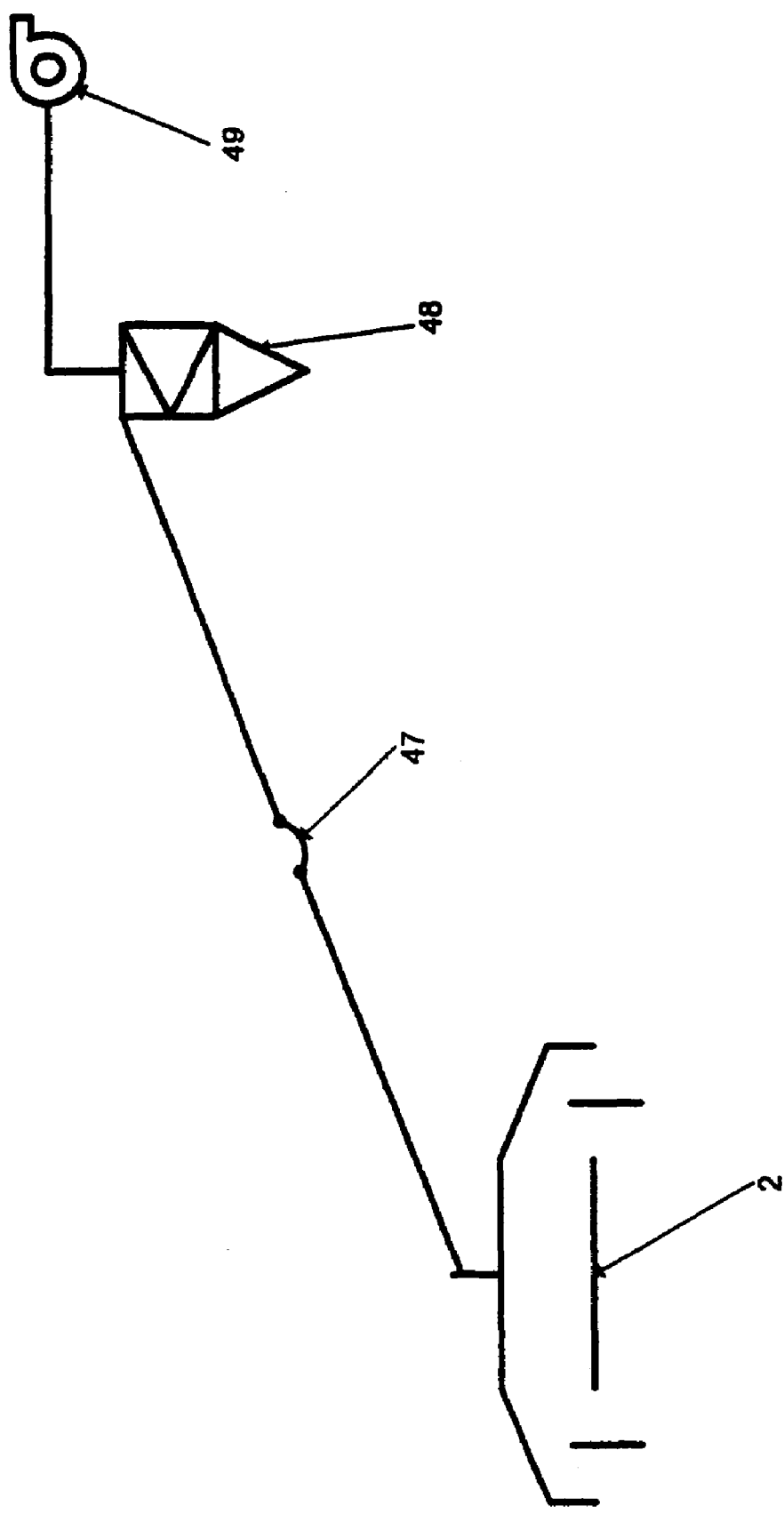
FIG. 19 is a perspective view of an air suction system to collect and separate the dust.

FIG. 19 Is a perspective view of an air suction system to collect and separate the dust. The dust, which is separated from the roof 1 by the cleaning device 2, is sucked by the blower 49 via the dust separator 48 and the hose 47.

The invention claimed is:

1. A method of cleaning a greenhouse soft roof mechanically to remove accumulated dust comprising:
    mounting at least one dust-cleaning device (2), on a powered platform (4);
    running said at least one dust-cleaning device (2) and said powered platform (4) along a moving bridge which comprises at least one pressure controlled device (12);
    supporting and moving said moving bridge (3) on a running system (5) on its two sides, which are supported and directed by gutters (6);
    moving said at least one dust cleaning device (2) over said soft roof; and
    controlling said at least one dust-cleaning device (2) to follow an irregular surface of said soft roof with limited pressure to avoid damage and to remove accumulated dust.

2. The method of claim 1, wherein said bridge is supported and run in the gutters on each side of an arch of the said soft roof and having the shape and dimensions to fit said arch.

3. The method of claim 2, wherein said bridge is being moved from one said arch of said roof to the next one by a moving system.

4. The method of claim 3, wherein said bridge is being moved from one said arch of the said roof to the next one by said moving system running on rails at the side of the wall of said greenhouse.

5. The method of claim 1, wherein said powered platform with said cleaning device is controlled to run along said bridge while cleaning the dust from said soft roof in a path of its width and said bridge being moved to its next stop for said cleaning device to clean another path parallel to the first one.

6. The method of claim 1, wherein said at least one powered platform with said at least one cleaning device and its said pressure controlled device is controlled to stop along said bridge at predetermined points and said bridge moves along said roof while said cleaning device is cleaning the dust from said soft roof in paths of its width along the roof.

7. The method of claim 1, wherein said cleaning device is combined with a dust collecting system.

8. The method of claim 7, wherein said dust collecting system is an air suctioning and separating system.

9. The method of claim 7, wherein said dust collecting system is a water washing and separating system.

10. A dust cleaning system for soft roofs comprising:
    at least one dust-cleaning device (2), which is being controlled to follow the irregular surface of the said soft roof (1) with limited pressure to avoid damage;
    said at least one dust-cleaning device (2), being mounted on a powered platform (4) and at least one pressure controlled device (12) is running along a moving bridge (3);
said moving bridge (3) is supported and moved by a running system (5) on its two sides, which are supported and directed by gutters (6).

11. The dust-cleaning system of claim 10, wherein said at least one dust-cleaning device (2), being mounted to a powered platform (4) by a universal joint (19) and two pressure controlled devices (12).

12. The dust cleaning system of claim 11, wherein said at least one dust-cleaning device (2) is a soft rotating brush.

13. The dust cleaning system of claim 11, wherein said at least one dust-cleaning device (2) is a soft sponge (16).

14. The dust-cleaning system of claim 11, wherein said at least one dust-cleaning device (2) is a soft rotating strips of cloth (17).

15. The dust-cleaning system of claim 11 being directed to clean a path of the said soft roof (1) along the said bridge (3).

16. The dust-cleaning system of claim 11 being directed to clean a path of the said soft roof (1) along the said roof (1).

17. The dust-cleaning system of claim 11, wherein said two pressure controlled devices (12) enable the dust-cleaning device (2) to adjust the height of each side to follow the irregular surface of the soft roof (1) with limited pressure to avoid damage.

18. The dust-cleaning system of claim 11, wherein said powered platform (4) is running along the bridge (3) by at least one powered wheel and other wheels to support the powered platform (4) to the bridge (3).

19. The dust-cleaning system of claim 18, wherein said at least one powered chain pulley running along a chain welded to the bridge (3) and being sensed and controlled to stop at predetermined positions.

20. The dust-cleaning system of claim 11, wherein said powered platform (4) is powered by a motor to run along the bridge (3).

21. The dust-cleaning system of claim 11, wherein said running system (5) of the bridge (3) has at least one wheel powered by a motor to move along the gutter.

* * * * *